(12) United States Patent
Sawada et al.

(10) Patent No.: US 8,939,590 B2
(45) Date of Patent: Jan. 27, 2015

(54) VEHICLE MIRROR DEVICE

(75) Inventors: Kazuhiro Sawada, Aichi-ken (JP);
Hiroyuki Muto, Aichi-ken (JP)

(73) Assignee: Kabushiki Kaisha Tokai-Rika-Denki-Seisakusho, Aichi-Ken (JP)

(*) Notice: Subject to any disclaimer, the term of this patent is extended or adjusted under 35 U.S.C. 154(b) by 107 days.

(21) Appl. No.: 13/611,520

(22) Filed: Sep. 12, 2012

(65) Prior Publication Data
US 2013/0070357 A1 Mar. 21, 2013

(30) Foreign Application Priority Data

Sep. 21, 2011 (JP) ................... 2011-206278

(51) Int. Cl.
*G02B 7/182* (2006.01)
*G02B 5/08* (2006.01)
*B60R 1/062* (2006.01)

(52) U.S. Cl.
CPC ...................................... *B60R 1/062* (2013.01)
USPC .......................................... 359/871; 359/844

(58) Field of Classification Search
None
See application file for complete search history.

(56) References Cited

U.S. PATENT DOCUMENTS

2004/0057139 A1* 3/2004 Shinohara ...................... 359/877
2010/0073949 A1* 3/2010 Sato ............................... 362/494

FOREIGN PATENT DOCUMENTS

| JP | S61-085537 | 6/1986 |
|---|---|---|
| JP | H01-027965 | 8/1989 |
| JP | H06-060546 | 8/1994 |
| JP | 2005-059822 | 3/2005 |
| JP | 2008-094314 | 4/2008 |
| JP | 2009-096286 A | 5/2009 |

OTHER PUBLICATIONS

Japanese Office Action dated May 7, 2014 and English translation of Reasons for Rejection.

* cited by examiner

*Primary Examiner* — Jade R Chwasz
(74) *Attorney, Agent, or Firm* — Roberts Mlotkowski Safran & Cole P.C.

(57) ABSTRACT

A covering member appropriately covers an opening hole in a accommodating body. In a vehicle door mirror device, look of a visor body at the outer periphery of a mirror is enhanced by an upper covering plate and a lower covering plate of an inner cover covering an upper recess portion and a lower recess portion, respectively, in a peripheral wall of the visor body. The upper covering plate and the lower covering plate abut the upper recess portion and the lower recess portion, respectively. The upper covering plate and the lower covering plate can accordingly be positioned in the upper recess portion and the lower recess portion, respectively. The upper covering plate and the lower covering plate can accordingly appropriately cover the upper recess portion and the lower recess portion, respectively.

6 Claims, 13 Drawing Sheets

VEHICLE MIRROR DEVICE

CROSS-REFERENCE TO RELATED APPLICATION

This application claims priority under 35 USC 119 from Japanese Patent Application No. 2011-206278 filed Sep. 21, 2011, the disclosure of which is incorporated by reference herein.

BACKGROUND OF THE INVENTION

1. Field of the Invention

The present invention relates to a vehicle mirror device in which a accommodating body accommodates a vehicle mirror.

2. Description of the Related Art

Japanese Patent Application Laid-Open (JP-A) No. 2009-96286 discloses a vehicle door mirror device. A mirror bracket is fixed inside a mirror housing, the mirror bracket supports a reflective mirror, and the reflective mirror is accommodated in an opening portion within the mirror housing. A missing portion is formed to a peripheral wall (an inner wall flange and a lower wall) forming the opening portion in the mirror housing, and the missing portion is covered by a projection portion of the mirror bracket.

In this vehicle door mirror device, the projection portion of the mirror bracket does not abut the missing portion of the mirror housing. The projection portion is therefore not positioned in the missing portion of the mirror housing, with the possibility that the projection portion may not appropriately cover the missing portion.

SUMMARY OF THE INVENTION

In consideration of the above circumstances, the present invention is to obtain a vehicle mirror device in which a covering member can appropriately cover an opening hole in an accommodating body.

A vehicle mirror device of a first aspect includes: an accommodating body that is provided with an opening accommodating chamber, a vehicle mirror being accommodated in an opening portion of the accommodating chamber and an opening hole being provided at a peripheral wall forming the opening portion of the accommodating chamber; a covering member that covers the opening hole; and an abut portion that is provided at the covering member and that abuts a portion of the opening hole of the accommodating body.

It is possible in the first aspect of the invention that the vehicle mirror device includes: the accommodating body that is provided with the opening accommodating chamber, the vehicle mirror being accommodated in the opening portion of the accommodating chamber and a first opening hole and a second opening hole being provided at the peripheral wall forming the opening portion of the accommodating chamber; the covering member that covers the first opening hole and the second opening hole; and a first abut portion and a second abut portion that are provided at the covering member and that respectively abut a portion of the first opening hole and a portion of the second opening hole of the accommodating body.

A vehicle mirror device of a second aspect is the vehicle mirror device of the first aspect in which the covering member includes a covering portion that covers the opening hole and an attachment section that is attached to an accommodating body side.

It is possible in the second aspect of the invention that the covering member includes an attachment section that is attached to an accommodating body side, and a first covering portion and a second covering portion that are respectively provided at one end portion and another end portion of the attachment section, and respectively cover the first opening hole and the second opening hole.

A vehicle mirror device of a third aspect is the vehicle mirror device of the second aspect in which the covering member includes a protrusion portion, the protrusion portion being coupled to the covering portion and the attachment section and protruding towards an accommodating chamber side.

It is possible in the third aspect of the invention that the covering member includes a protrusion portion, the protrusion portion being coupled to the first covering portion, the second covering portion and the attachment section, and protruding towards an accommodating chamber side.

A vehicle mirror device of a fourth aspect is the vehicle mirror device of the second aspect or the third aspect in which the attachment section includes a recess portion into which the mirror enters when the mirror is tilted.

A vehicle mirror device of a fifth aspect is the vehicle mirror device of any one of the second aspect to the fourth aspect in which the attachment section includes an engagement portion that engages with the accommodating body side and stops rotation of the covering member.

A vehicle mirror device of a sixth aspect is the vehicle mirror device of any one of the first aspect to the fifth aspect in which the accommodating body includes an accommodating section in which the accommodating chamber is provided, and an assembled section that is assembled to the accommodating section at a side opposite to the accommodating chamber; and the accommodating section and the assembled section are assembled at the opening hole.

It is possible in the sixth aspect of the invention that the accommodating body includes an accommodating section in which the accommodating chamber is provided, and an assembled section that is assembled to the accommodating section at a side opposite to the accommodating chamber; and the accommodating section and the assembled section are assembled at the first opening hole and the second opening hole.

In the vehicle mirror device of the first aspect, the accommodating chamber of the accommodating body is open, and the accommodating body accommodates the vehicle mirror in the open portion of the accommodating chamber. The peripheral wall of the accommodating body forms the open portion of the accommodating chamber, and the opening hole is provided to the peripheral wall. The covering member covers the opening hole.

The abut portion is provided to the covering member, and the abut portion abuts the opening hole portion of the accommodating body. The covering member can accordingly be positioned in the opening hole portion of the accommodating body, and the opening hole of the accommodating body can be appropriately covered by the covering member.

In the vehicle mirror device of the second aspect, the covering portion of the covering member covers the opening hole of the accommodating body.

The attachment section is provided at the covering member, and the attachment section is attached to the accommodating body side. The covering member can accordingly be firmly attached to the accommodating body side.

In the vehicle mirror device of the third aspect, the protrusion portion is provided at the covering member, and the protrusion portion is coupled to the covering portion and to the attachment section of the covering member.

The protrusion portion protrudes towards the accommodating chamber side of the accommodating body. Hence, when, after molding the covering member, the covering member shrinking, due to the protrusion portion, displacement force acts on the covering portion towards the opening hole side of the accommodating body with respect to the attachment section. The covering portion can thereby appropriately cover the opening hole.

In the vehicle mirror device of the fourth aspect, the recess portion is provided at the attachment section of the covering member, and the mirror enters the recess portion when tilted. The attachment section can thereby be suppressed from restricting tilting of the mirror.

In the vehicle mirror device of the fifth aspect, the engagement portion is provided at the attachment section of the covering member. The engagement portion engages with the accommodating body side and stops rotation of the covering member. The covering member can thereby be appropriately positioned to the accommodating body side.

In the vehicle mirror device of the sixth aspect, the accommodating chamber is provided to the accommodating section of the accommodating body, and the assembled section of the accommodating body is assembled at the opposite side to the accommodating chamber of the accommodating section.

The accommodating section and the assembled section are assembled at the opening hole of the accommodating body. The assembly portion of the accommodating section and the assembled section can thereby be covered by the covering member.

BRIEF DESCRIPTION OF THE DRAWINGS

Embodiments of the present invention will be described in detail with reference to the following figures, wherein.

DETAILED DESCRIPTION OF THE INVENTION

Figure 1:
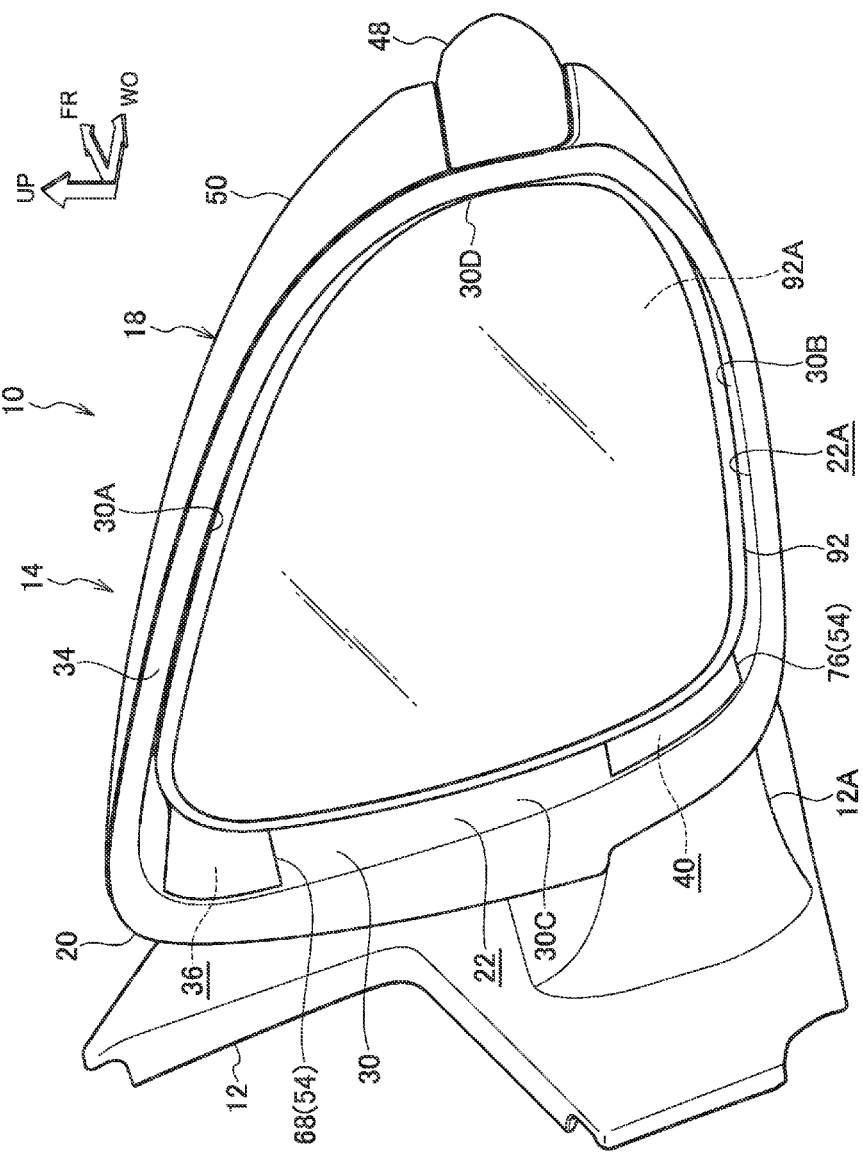
FIG. 1 is a perspective view illustrating a vehicle door mirror device according to an exemplary embodiment of the present invention, viewed diagonally from a vehicle right-hand rear side.
Figure 2:
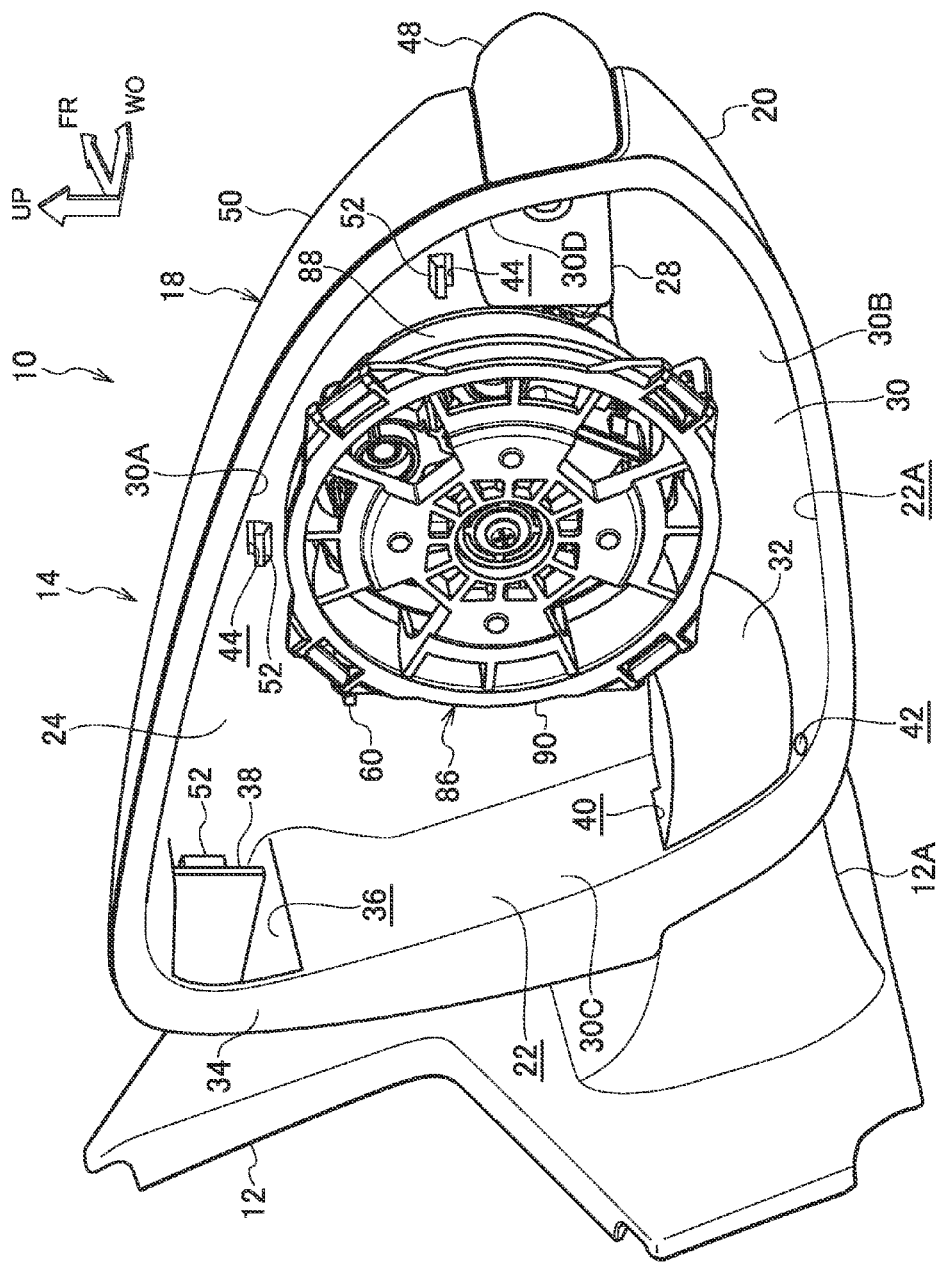
FIG. 2 is a perspective view illustrating relevant portions of a vehicle door mirror device (in a state in which a mirror and inner cover have been removed) according to an exemplary embodiment of the present invention, viewed diagonally from a vehicle right-hand rear side.
Figure 3:
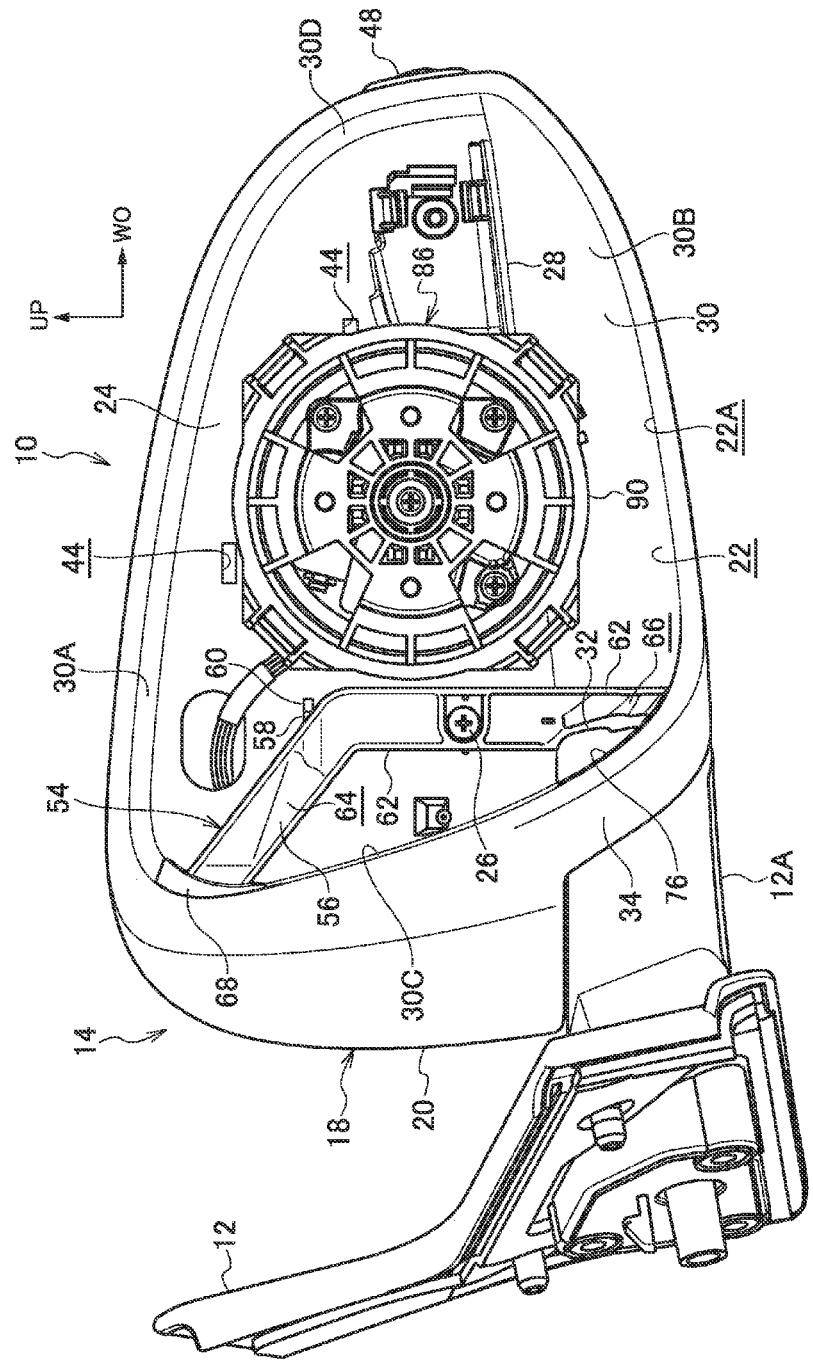
FIG. 3 is a face-on view illustrating relevant portions of a vehicle door mirror device (in a state in which the mirror has been removed) according to an exemplary embodiment of the present invention, viewed from the vehicle rear side.
Figure 4:
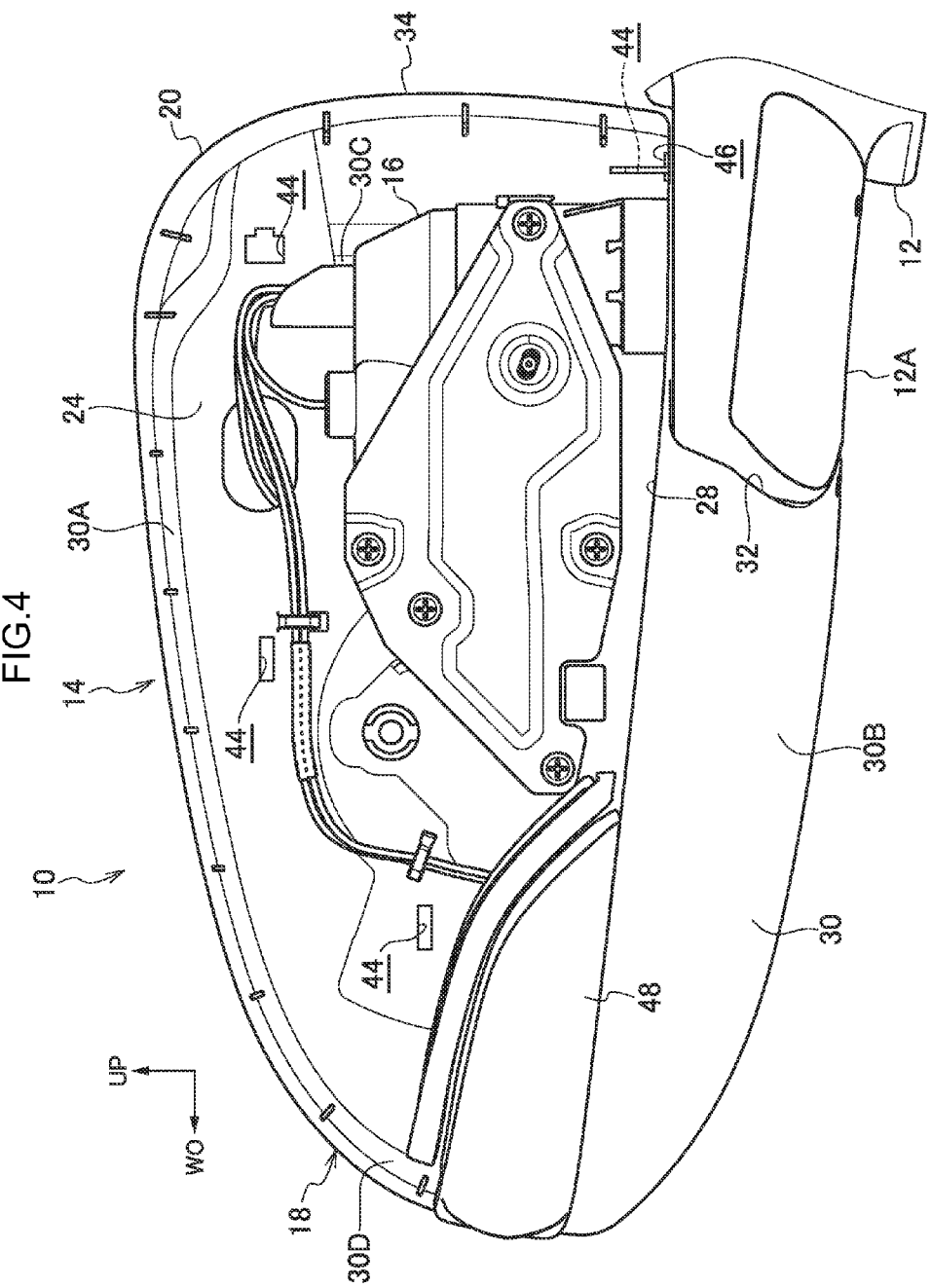
FIG. 4 is a back view illustrating relevant portions of a vehicle door mirror device (in a state in which a visor cover has been removed) according to an exemplary embodiment of the present invention, viewed from the vehicle front side.
Figure 5:
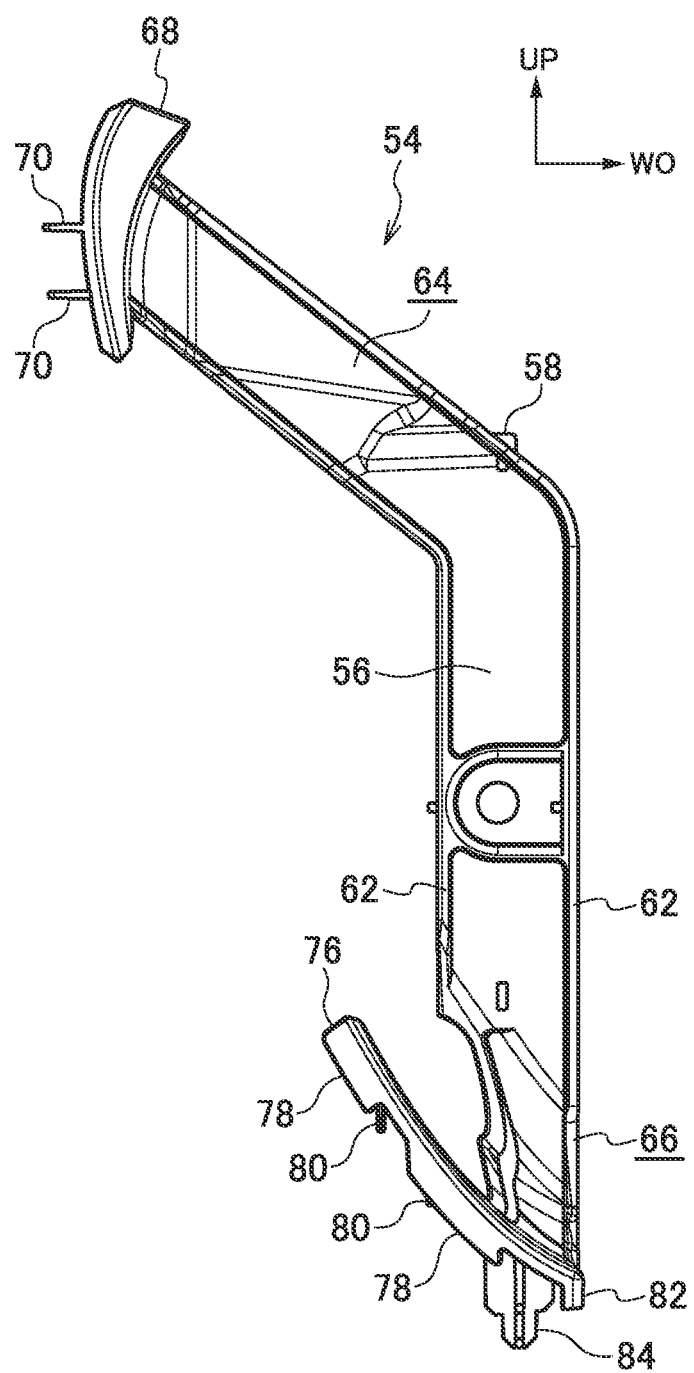
FIG. 5 is a face-on view illustrating an inner cover of a vehicle door mirror device according to an exemplary embodiment of the present invention, viewed from the vehicle rear side.
Figure 6:
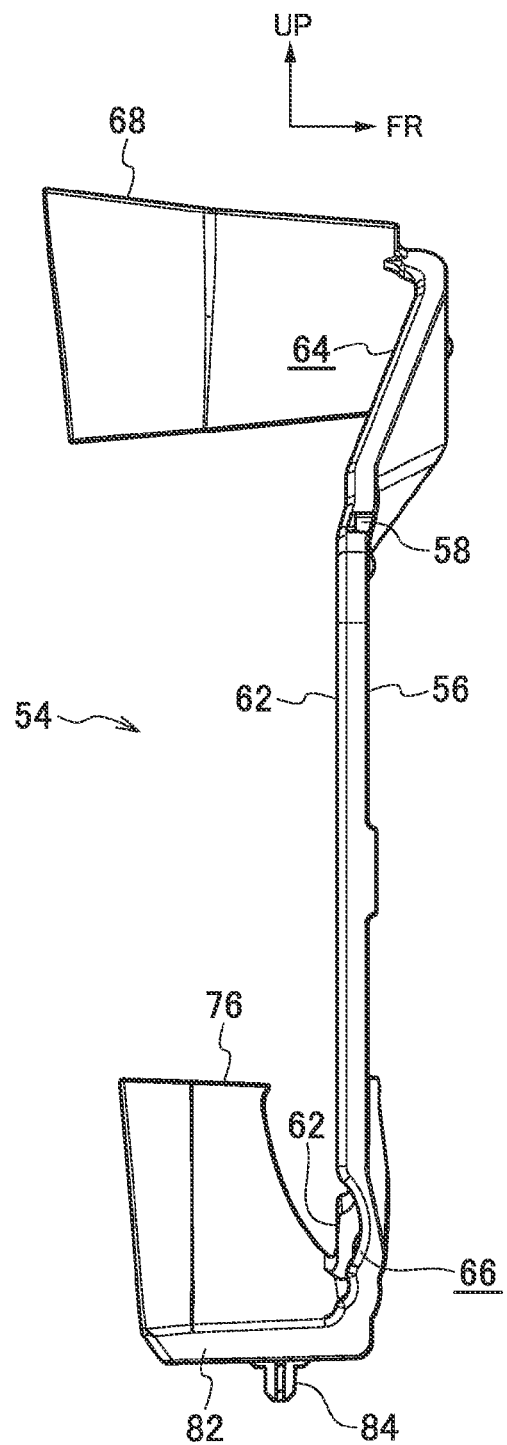
FIG. 6 is a side view illustrating an inner cover of a vehicle door mirror device according to an exemplary embodiment of the present invention, viewed from the vehicle right side.
Figure 7:
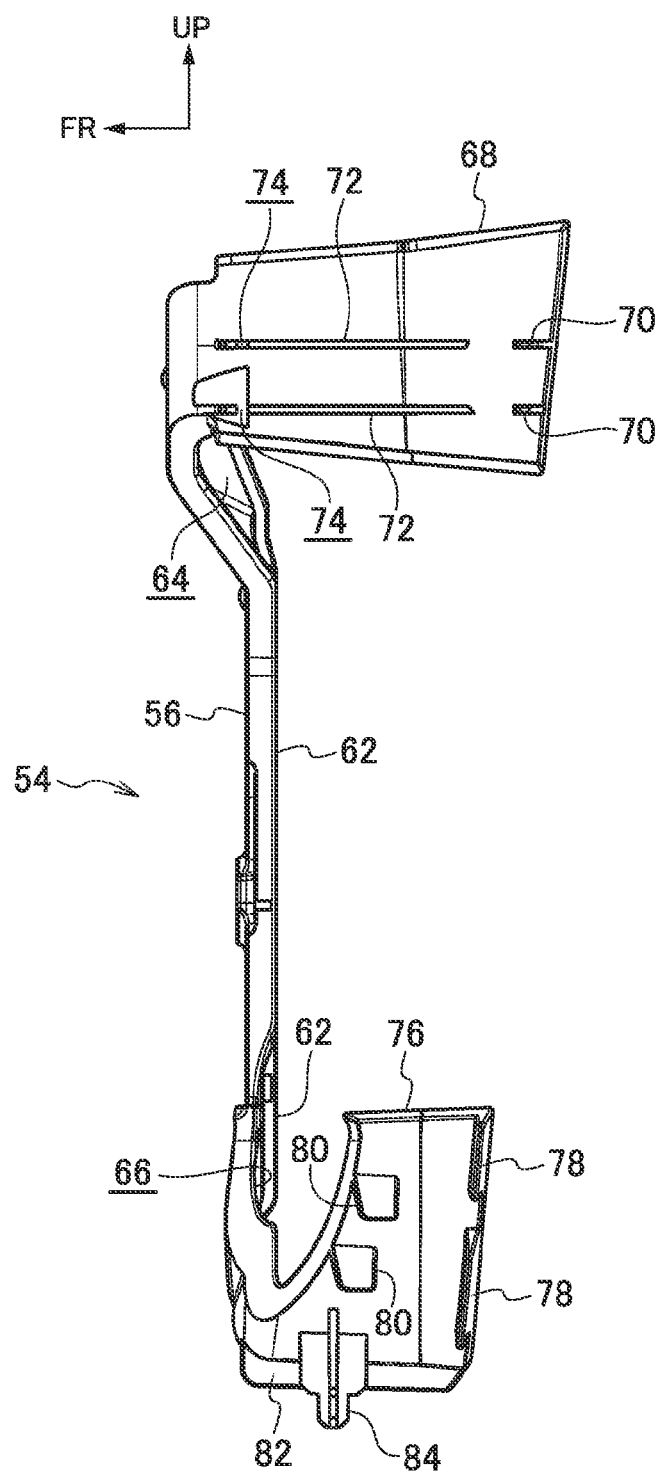
FIG. 7 is a side view illustrating an inner cover of a vehicle door mirror device according to an exemplary embodiment of the present invention, viewed from the vehicle left side.
Figure 8:
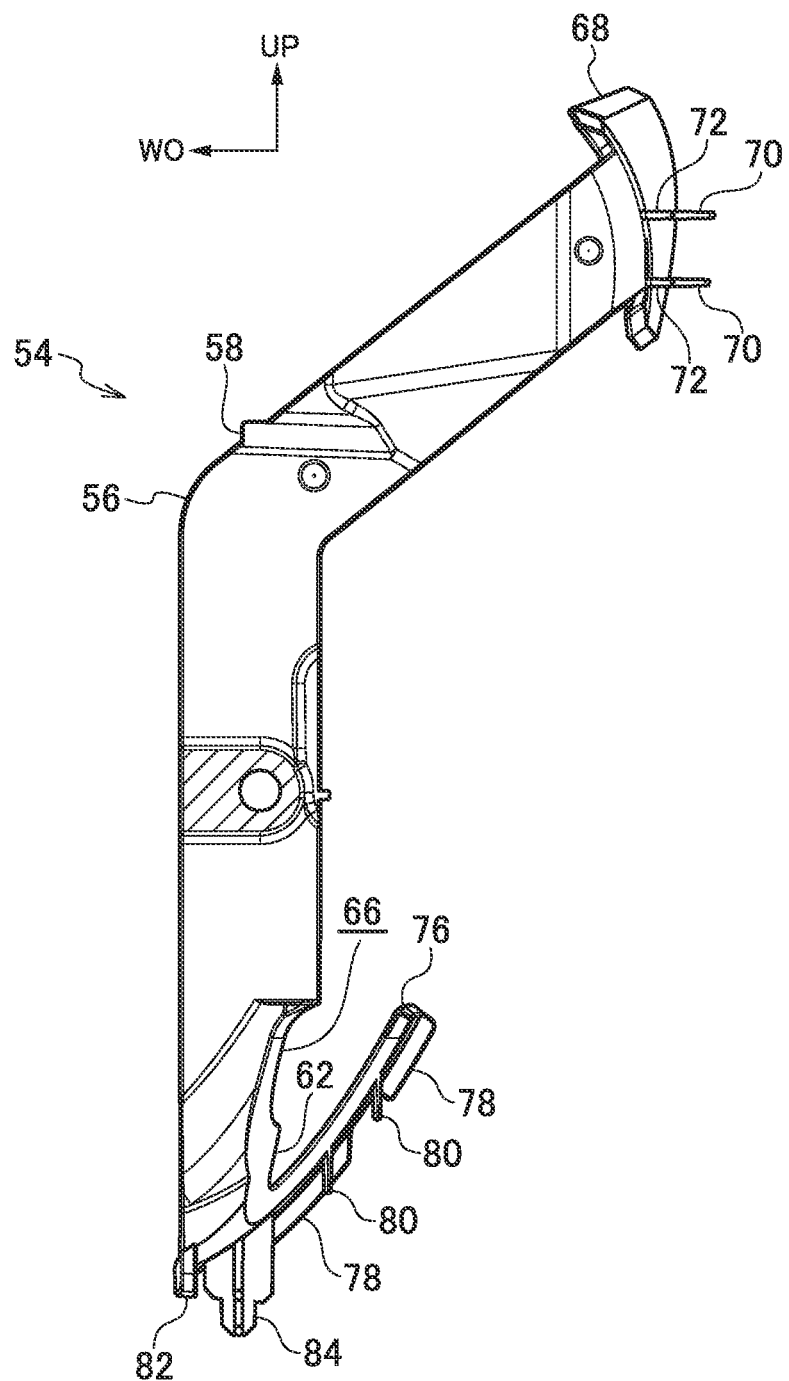
FIG. 8 is a back view illustrating an inner cover of a vehicle door mirror device according to an exemplary embodiment of the present invention, viewed from the vehicle front side.
Figure 9:
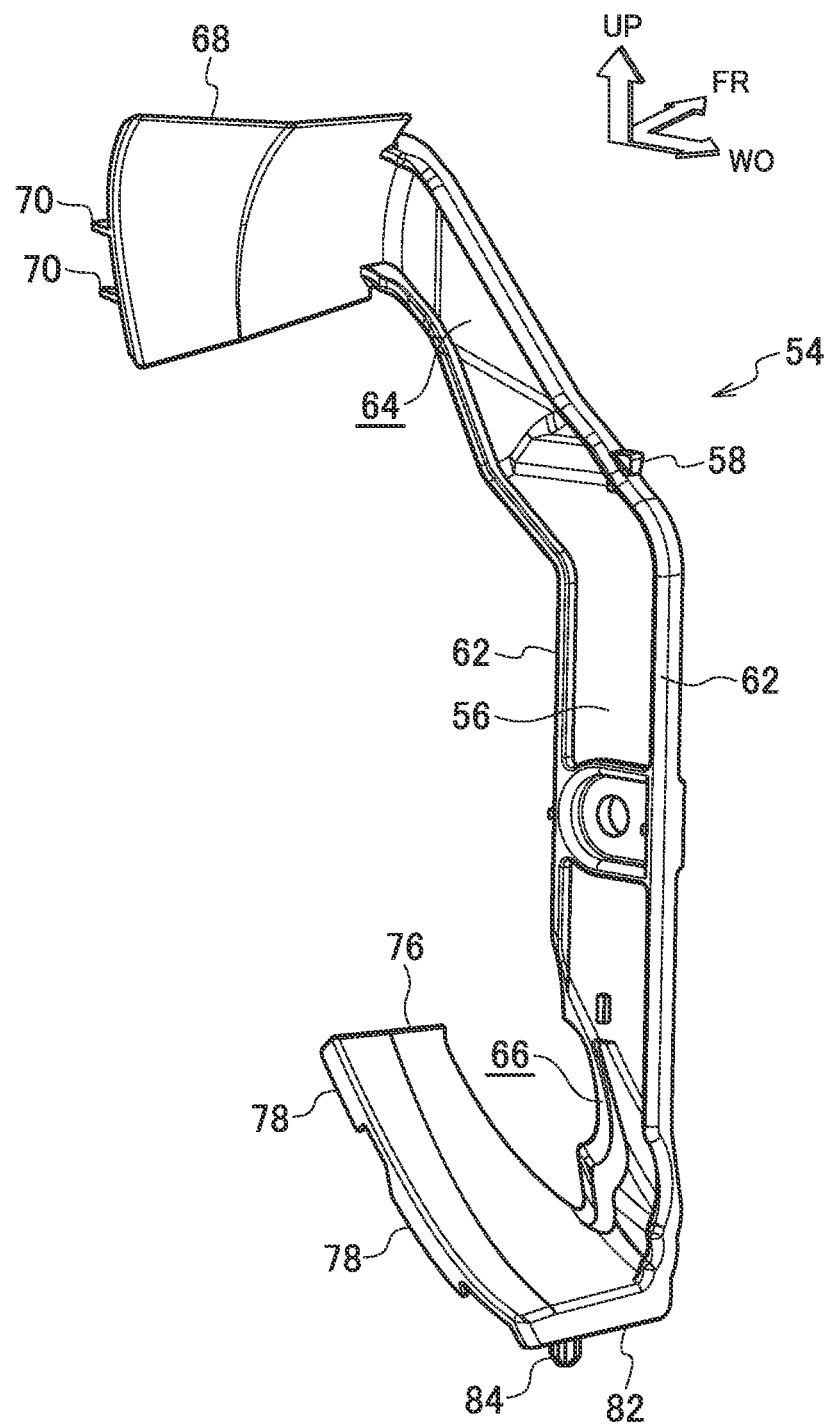
FIG. 9 is a perspective view illustrating an inner cover of a vehicle door mirror device according to an exemplary embodiment of the present invention, viewed diagonally from a vehicle right-hand rear side.
Figure 10:
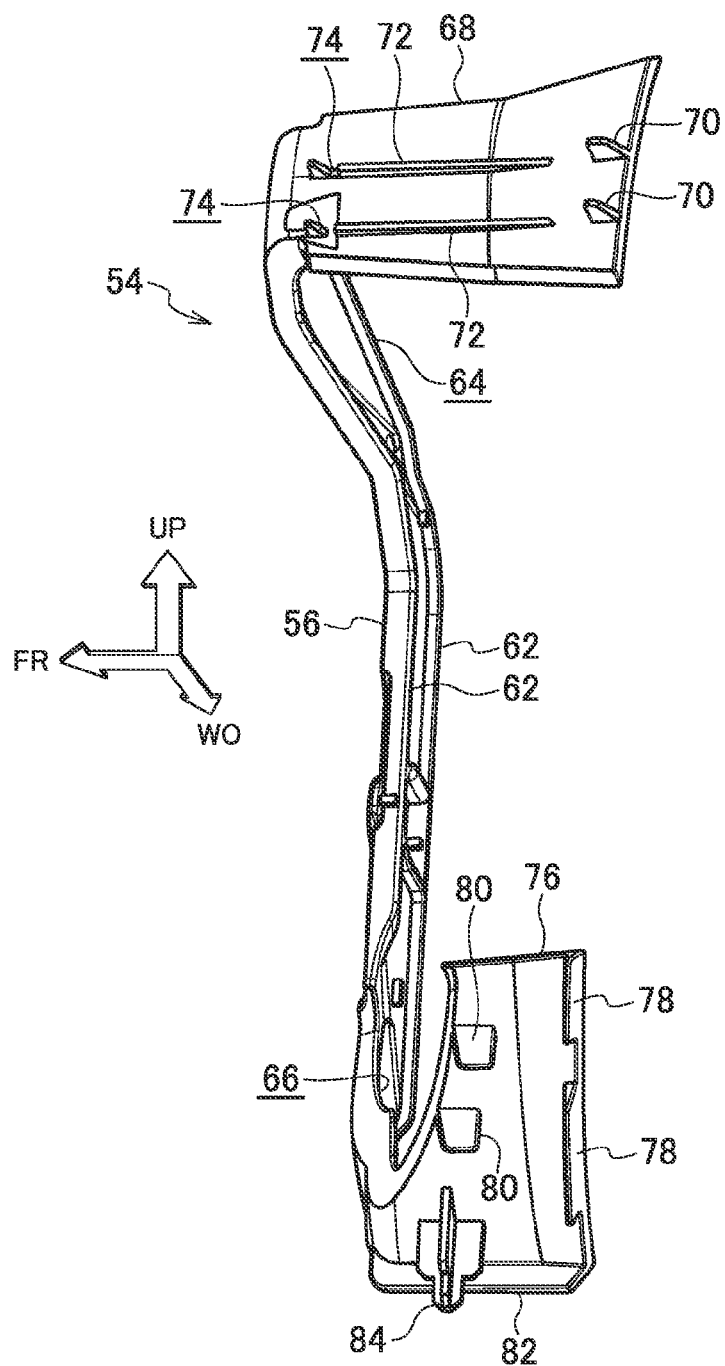
FIG. 10 is a perspective view illustrating an inner cover of a vehicle door mirror device according to an exemplary embodiment of the present invention, viewed diagonally from a vehicle left-hand rear side.
Figure 11:
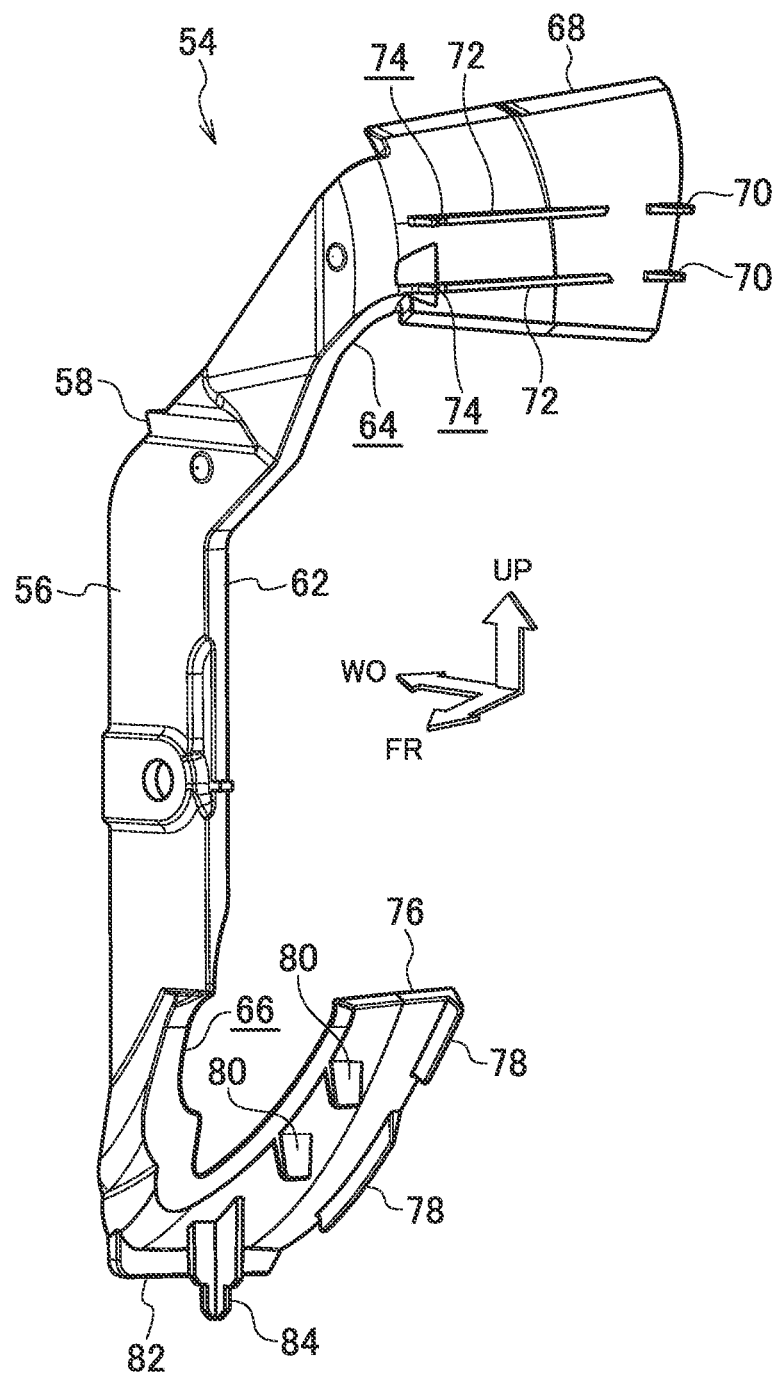
FIG. 11 is a perspective view illustrating an inner cover of a vehicle door mirror device according to an exemplary embodiment of the present invention, viewed diagonally from a vehicle left-hand front side.
Figure 12:
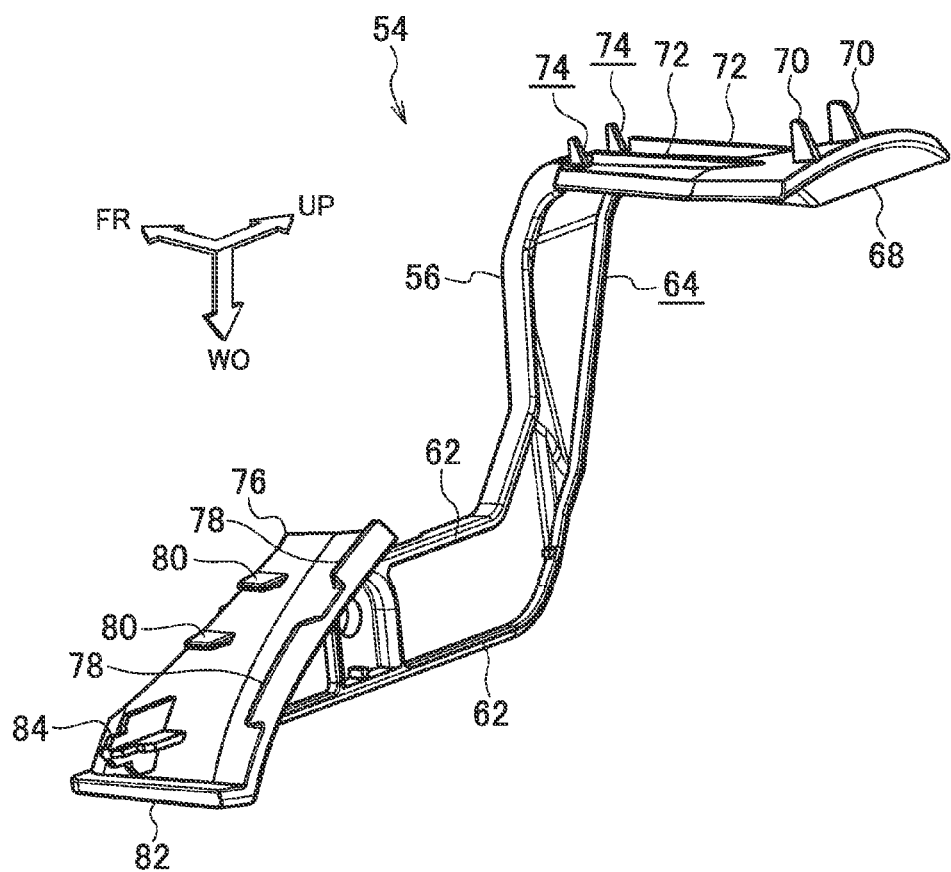
FIG. 12 is a perspective view illustrating an inner cover of a vehicle door mirror device according to an exemplary embodiment of the present invention, viewed diagonally from a vehicle bottom rear side.
Figure 13:
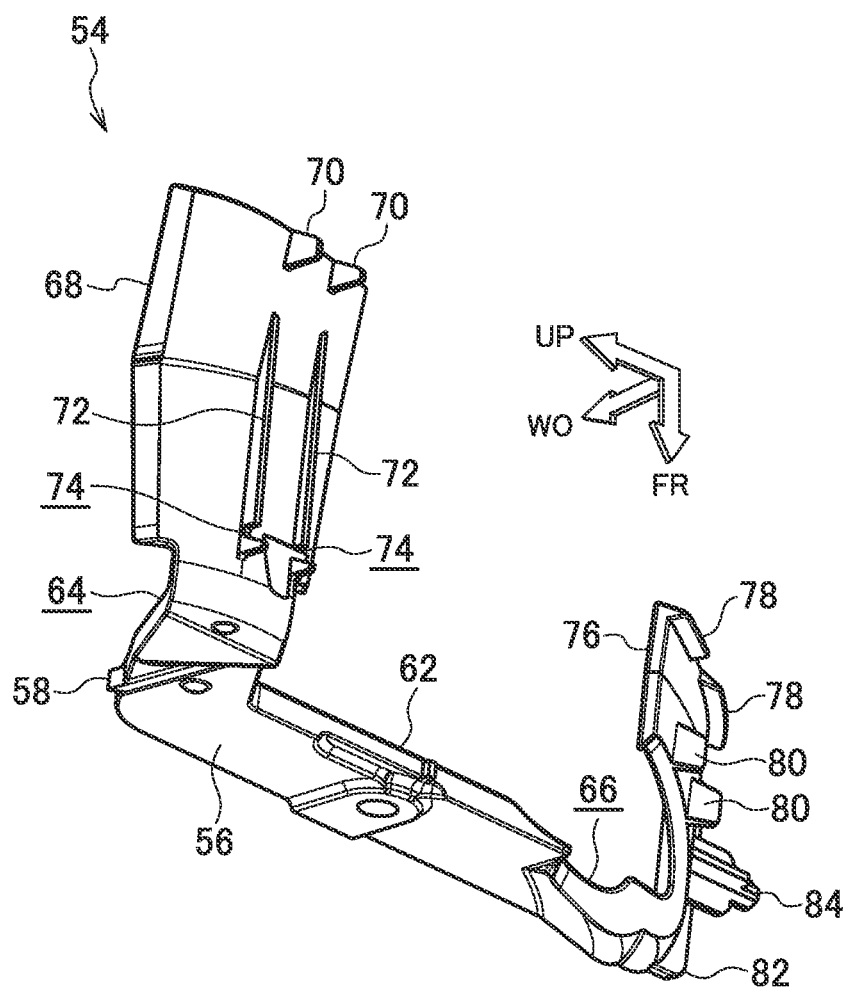
FIG. 13 is a perspective view illustrating an inner cover of a vehicle door mirror device according to an exemplary embodiment of the present invention, viewed diagonally from a vehicle top front side.

FIG. 1 is a perspective view showing a vehicle door mirror device 10 according to an exemplary embodiment, to which the vehicle mirror device of the present invention has been applied, viewed diagonally from a vehicle right-hand rear side. FIG. 2 is a perspective view showing relevant portions of the vehicle door mirror device 10, viewed diagonally from the vehicle right-hand rear side. FIG. 3 is a face-on view showing relevant portions of the vehicle door mirror device 10, viewed from the vehicle rear direction. FIG. 4 is a back view showing relevant portions of the vehicle door mirror device 10, viewed from the vehicle front direction. In the drawings the vehicle front direction is indicated by arrow FR, the vehicle width direction outside direction (right-hand direction) is indicated by the arrow WO, and the top (upper) direction is indicated by the arrow UP.

The vehicle door mirror device 10 of the present exemplary embodiment is provided at an externally portion, at a vehicle front side end portion at a top-bottom (upper-lower) direction intermediate portion of a vehicle door (not shown in the drawings).

As shown in FIG. 1 to FIG. 4, the vehicle door mirror device 10 is provided, at a vehicle width direction inside end portion, with a stay 12 serving as a support member. The vehicle door mirror device 10 is supported by the door (vehicle body side) by attaching the stay 12 to the vehicle door. The stay 12 is provided with a block shaped support section 12A. The support section 12A protrudes towards the vehicle width direction outside, and a vehicle width direction outside portion (protrusion end portion) of the support section 12A is configured with a substantially hemispherical columnar profile.

A main body portion 14 is supported by the stay 12.

As shown in FIG. 4, the main body portion 14 is provided with a stowage (housing) device 16 (retractor) serving as a rotation unit. The stowage device 16 is supported above the support portion 12A of the stay 12. The stowage device 16 is rotatable with respect to the stay 12, and allows the main body portion 14 (including a mirror 92, described below) to be manually or electronically rotated with respect to the stay 12. Accordingly, by rotating the main body portion 14 from its usual position (deployment position, standing out position) with respect to the stay 12 towards the vehicle rear side and the vehicle width direction inside, the main body portion 14 is housed (rear housed). By rotating the main body portion 14 from its usual position with respect to the stay 12 towards the vehicle front side and the vehicle width direction inside, the main body portion 14 is forward folded (front housed).

A visor 18 serving as an accommodating body is supported by the stowage device 16.

The visor 18 is provided with a visor body 20 serving as an accommodating section and made from opaque resin. A vehicle width direction inside portion of the visor body 20 is attached to the stowage device 16 at the vehicle front side such that the visor 18 is supported by the stowage device 16. At the visor body 20, a substantially box shaped accommodating chamber 22 is formed. The vehicle rear side face of the accommodating chamber 22 is configured with an opening 22A.

A vehicle front side wall of the accommodating chamber 22 is configured by a plate shaped bottom wall 24. The bottom wall 24 is disposed substantially orthogonally to the vehicle front-rear direction. A vehicle width direction inside portion of the bottom wall 24 is attached to the stowage device 16 from the accommodating chamber 22 side (vehicle rear side) by a screw 26 (see FIG. 3) serving as an attaching member.

A substantially flat plate shaped coupling wall 28 is coupled to a lower end of the bottom wall 24. The coupling wall 28 is disposed substantially orthogonally to the upper-lower direction. The coupling wall 28 extends from the bottom wall 24 towards the vehicle front side and the vehicle width direction inside, and the stowage device 16 is inserted into a vehicle width direction inside portion of the coupling wall 28.

The opening 22A portion of the accommodating chamber 22 is formed from a tubular shaped peripheral wall 30. A top side portion, lower side portion, vehicle width direction inside portion and vehicle width direction outside portion of the peripheral wall 30 are respectively configured as an upper peripheral wall 30A, a lower peripheral wall 30B, an inner peripheral wall 30C and an outer peripheral wall 30D. The upper peripheral wall 30A, the inner peripheral wall 30C and the outer peripheral wall 30D are coupled to the bottom wall 24. The lower peripheral wall 30B is inclined so as to rise up towards the upper side on progression towards the vehicle front side, and is coupled to a vehicle front side end of the coupling wall 28. Between a vehicle width direction inside end of the lower peripheral wall 30B and the coupling wall 28, a curved plate shaped circular peripheral wall 32 is coupled. The circular peripheral wall 32 is disposed along a vehicle width direction outside portion of the support portion 12A of the stay 12.

An external wall 34 of a substantially L-shaped cross-sectional profile is provided to the visor body 20 at the outer periphery of the upper peripheral wall 30A, inner peripheral wall 30C and outer peripheral wall 30D. An end of the external wall 34 on one side is coupled to vehicle rear side ends of the upper peripheral wall 30A, inner peripheral wall 30C and outer peripheral wall 30D, and an end of the external wall 34 on the other side extends out to the vehicle front side. The other side portion at the vehicle width direction inside portion of the external wall 34 is coupled to the coupling wall 28 and the circular peripheral wall 32.

A substantially rectangular upper recess (concave) portion 36 serving as an opening hole is formed to an upper portion of the inner peripheral wall 30C. The upper recess portion 36 is open to the accommodating chamber 22. The vehicle front side wall of the upper recess portion 36 is configured by the bottom wall 24 and the vehicle rear side wall and vehicle width direction inside wall of the upper recess portion 36 are configured by the external wall 34. A substantially rectangular flat plate shaped abut wall 38 serving as an abutted portion spans between the upper wall and lower wall of the upper recess portion 36. The abut wall 38 divides the upper recess portion 36 into a vehicle front side portion and a vehicle rear side portion. An upper face (the portion connected to the upper peripheral wall 30A) and a lower face (the portion connected to the inner peripheral wall 30C) of the opening portion of the upper recess portion 36 are respectively convex curved towards the upper recess portion 36 side.

A substantially rectangular lower recess (concave) portion 40 serving as an opening hole is formed to a lower portion of the inner peripheral wall 30C. The lower recess portion 40 is open to the accommodating chamber 22. The upper wall, lower wall, vehicle front side wall, vehicle rear side wall and vehicle width direction inside wall of the lower recess portion 40 are configured by the coupling wall 28, the lower peripheral wall 30B, the circular peripheral wall 32 and the external wall 34 respectively. A circular abut hole 42 serving as an abutted portion is formed through the lower peripheral wall 30B in the lower recess portion 40. The abut hole 42 is disposed at the lowest position of the accommodating chamber 22, such that water in the accommodating chamber 22 can drain out of the visor body 20.

Rectangular assembly holes 44 are formed to the visor body 20 at a vehicle width direction intermediate at an upper portion, a vehicle width direction outside at an upper-lower direction intermediate portion, and at vehicle width direction inside at upper and lower portions. The assembly holes 44 at the vehicle width direction intermediate portion, the vehicle width direction outside portion and the vehicle width direction inside upper portion penetrate the bottom wall 24, and the assembly hole 44 at the vehicle width direction inside upper portion penetrates (is in communication with) the upper recess portion 36. The assembly hole 44 at the vehicle width direction inside lower portion is disposed in the vicinity of the upper side of the coupling wall 28, and a work hole 46 (see FIG. 4) is formed through the coupling wall 28 at the lower side of this assembly hole 44. The work hole 46 is disposed directly above the support portion 12A of the stay 12. When the main body portion 14 is housed or folded forward, the work hole 46 is moved towards the vehicle front side or the vehicle rear side of the support portion 12A, respectively.

An elongated block shaped lamp 48 serving as an additional mechanism is attached to the vehicle front side of the visor body 20 directly above the vehicle width direction outside portion of the coupling wall 28. The lamp 48 is configured as, for example, an indicator light, and, for example, it is possible to indicate the direction of vehicle progress by illuminating the lamp 48.

A curved plate shaped visor cover 50 serving as an assemble section and made from opaque resin is provided at the vehicle front side of the visor body 20 and at the upper side of the coupling wall 28 and the lamp 48. The visor cover 50 is integrally provided with elongated substantially plate shaped assembly clips 52 serving as assembly members at a vehicle width direction intermediate at an upper portion, a vehicle width direction outside at an upper-lower direction intermediate portion, and at vehicle width inside at upper and lower portions. The assembly clips 52 project from the visor cover 50 towards the vehicle rear side. The projection leading end of each of the assembly clips 52 protrudes out in the thickness direction of the assembly clip 52, and the visor cover 50 is assembled to the visor body 20 by the assembly clips 52 resiliently deforming and engaging with the assembly holes 44 of the visor body 20 at the projection leading ends. The outer periphery of the visor cover 50 is fitted to the vehicle front side end portions of the external wall 34 and the coupling wall 28, and to an upper portion of the lamp 48. The visor cover 50 covers the upper side of the visor body 20 which is above the coupling wall 28 (including the stowage device 16) and an upper end portion of the lamp 48 from the vehicle front side.

As shown in detail in FIG. 5 to FIG. 13, an opaque resin inner cover 54 (visor inner cover) is attached to a vehicle width direction inside portion of the accommodating chamber 22 of the visor body 20. The inner cover 54 is provided with an elongated plate shaped attachment plate 56 serving as an attachment section. A lower side section of the attachment plate 56 extends in the upper-lower direction and an upper side section of the attachment plate 56 is extends in a direction towards the vehicle width direction inside on progression towards the upper side. An upper-lower direction intermediate portion of the lower side section of the attachment plate 56 is attached, together with the bottom wall 24 of the visor body 20, by the screw 26 to the stowage device 16 from the accommodating chamber 22 side (the vehicle rear side). The inner cover 54 is accordingly attached to the visor body 20.

A triangular column shaped engagement portion 58 is integrally provided to a lower portion of the upper side section of the attachment plate 56. The engagement portion 58 projects from the attachment plate 56 towards the vehicle width direction outside. A rectangular column shaped engaged portion 60 is integrally provided to the bottom wall 24 of the visor body 20 at the vehicle width direction outside of the engagement portion 58. The engaged portion 60 projects from the bottom wall 24 towards the vehicle rear side. The engagement portion 58 engages with (abuts) the engaged portion 60, so stopping rotation towards the vehicle width direction outside. Rotation of the inner cover 54 about the screw 26 in the direction of rotation attachment (the rotation fastening direction) of the screw 26 is accordingly stopped.

Elongated rectangular column shaped protrusion portions 62 are integrally provided to both width direction ends of the attachment plate 56. The protrusion portions 62 are disposed along the entire length direction of the attachment plate 56, reinforcing the attachment plate 56.

The upper side section of the attachment plate 56 (including the protrusion portions 62) is inclined in a direction towards the vehicle front side on progression towards the upper side. An inclined recess (concave) portion 64 serving as a recess (concave) portion is formed at the upper side section of the attachment plate 56 (including the protrusion portions 62). A lower portion of the lower side section of the attachment plate 56 (including the protrusion portions 62) is concave curved in towards the vehicle front side, forming a curved recess (concave) portion 66 serving as a recess (concave) portion at the lower portion of the lower side section of the attachment plate 56 (including the protrusion portions 62).

The upper end of the attachment plate 56 is coupled to a substantially rectangular plate shaped upper covering plate 68 serving as a covering portion. The upper ends of the protrusion portions 62 are coupled to the upper covering plate 68, thereby reinforcing the coupling portion between the attachment plate 56 and the upper covering plate 68. The upper covering plate 68 extends from the upper end of the attachment plate 56 towards the vehicle rear side, and the upper covering plate 68 is configured so as to curve in a concave shape in the extension width direction (the width direction). The upper covering plate 68 covers the upper recess portion 36 of the visor body 20. The front face (the face on the accommodating chamber 22 side) of the upper covering plate 68 is configured with a curved shape (profile) so as to be continuous with the faces (the faces on the accommodating chamber 22 side) of the upper peripheral wall 30A and the inner peripheral wall 30C of the visor body 20.

The upper face, lower face and vehicle rear side face of the upper covering plate 68 are inclined in a direction such that the back face (the face on the upper recess portion 36 side) of the upper covering plate 68 has a smaller surface area than the front face of the upper covering plate 68. The upper face, lower face and vehicle rear side face of the upper covering plate 68 respectively function as abut portions, and are fitted to (abut) the upper face, lower face and vehicle rear side face (the external wall 34) of the opening portion of the upper recess portion 36.

A pair of trapezoid plate shaped first upper abut plates 70 serving as abut portions is formed protruding from the vehicle rear side end of the back face of the upper covering plate 68. The vehicle rear side end faces of the first upper abut plates 70 configure the same plane as the vehicle rear side face of the upper covering plate 68, and are fitted to (abut) the vehicle rear side face (the external wall 34) of the opening portion of the upper recess portion 36. A pair of elongated plate shaped second upper abut plates 72 serving as abut portions is formed protruding from the back face of the upper covering plate 68 at the vehicle front side of the first upper abut plates 70. The second upper abut plates 72 are disposed along the vehicle front-rear direction. Trapezoid plate shaped abut recess (concave) portions 74 are formed at a vehicle front side portion of the second upper abut plates 72. The abut recess portions 74 pass through (penetrate) the second upper abut plates 72 in the upper-lower direction, and the abut wall 38 inside the upper recess portion 36 is fitted to (abuts) the abut recess portions 74.

A substantially rectangular plate shaped lower covering plate 76 serving as a covering portion is coupled to the lower end of the attachment plate 56. The lower ends of the protrusion portions 62 are coupled to the lower covering plate 76, thereby reinforcing the coupling portion between the attachment plate 56 and the lower covering plate 76. The lower covering plate 76 projects out towards the vehicle rear side with respect to the attachment plate 56, and extends in a direction towards the vehicle width direction inside on progression from the lower end of the attachment plate 56 towards the upper side. The lower covering plate 76 is curved with a concave profile along the extension direction (the length direction). The lower covering plate 76 covers the lower recess portion 40 of the visor body 20, and the front face (the face on the accommodating chamber 22 side) of the lower covering plate 76 is configured with a curved shape (profile) so as to be continuous with the faces (the faces on the accommodating chamber 22 side) of the lower peripheral wall 30B and the inner peripheral wall 30C of the visor body 20.

The upper face, vehicle front side face and vehicle rear side face of the lower covering plate 76 are inclined in a direction such that the back face (the face on the lower recess portion 40 side) of the lower covering plate 76 has a smaller surface area than the front face. The upper face, vehicle front side face and vehicle rear side face of the lower covering plate 76 respectively function as abut portions, and are fitted to (abut) the upper face (the coupling wall 28), vehicle front side face (the circular peripheral wall 32) and vehicle rear side face (external wall 34) of the opening portion of the lower recess portion 40.

A pair of elongated plate shaped first lower abut plates 78 serving as abut portions is formed protruding from the vehicle rear side end of the back face of the lower covering plate 76. The vehicle rear side faces of the first lower abut plates 78 configured the same plane as the vehicle rear side end face of the lower covering plate 76, and are fitted to (abut) the vehicle rear side face (the external wall 34) of the opening portion of the lower recess portion 40. A pair of trapezoid plate shaped second lower abut plates 80 serving as abut portions is formed protruding from the back face of lower covering plate 76 at the vehicle front side of the first lower abut plates 78. The vehicle front side end faces of the second lower abut plates 80 configure the same plane as the vehicle front side face of the lower covering plate 76, and are fitted to (abut) the vehicle front side face (the circular peripheral wall 32) of the opening portion of the lower recess portion 40. An elongated plate shaped third lower abut plate 82 serving as an abut portion is formed protruding from the lower end of the back face of the lower covering plate 76. The lower face of the third lower abut plate 82 is fitted to (abuts) the lower face (the lower peripheral wall 30B) of the opening portion of the lower recess portion 40.

An abut projection 84 with a cross-shaped cross-sectional profile and serving as an abut portion is formed protruding from a lower portion (in the vicinity of the lower end) of the back face of the lower covering plate 76. A lower side portion of the abut projection 84 is configured with a smaller diameter than an upper side portion thereof, and the abut projection 84 is fitted to (abuts) the abut hole 42 in the lower peripheral wall 30B of the visor body 20. The upper side portion of the abut projection 84 abuts the periphery of the abut hole 42 of the lower peripheral wall 30B, thereby suppressing or preventing the lower side portion of the abut projection 84 from being disposed at the lower end of the abut hole 42. Generation of wind noise due to the abut hole 42 and the abut projection 84 during vehicle running is accordingly suppressed.

As shown in FIG. 2 and FIG. 3, a mirror face adjustment device 86 (drive unit) serving as a tilting unit is provided inside the accommodating chamber 22 of the visor body 20, and a fixed portion 88 is provided to a vehicle front side portion of the mirror face adjustment device 86. The fixed portion 88 is fixed to a vehicle width direction intermediate portion of the bottom wall 24 of the visor body 20. The mirror face adjustment device 86 is thereby supported by the visor body 20.

A tilting body 90 is supported to a vehicle rear side of the fixed portion 88. The tilting body 90 can be tilted electrically or manually with respect to the fixed portion 88.

A substantially rectangular plate shaped mirror 92 (see FIG. 1) is detachably mounted to the vehicle rear side of the tilting body 90. The mirror 92 is housed in the accommodating chamber 22 (within the peripheral wall 30) of the visor body 20 in a state wherein a mirror face 92A faces the vehicle rear side. The mirror 92 covers, from the vehicle rear side, the assembly holes 44 at the vehicle width direction intermediate at the upper portion and at the vehicle width direction outside at the upper-lower direction intermediate portion of the visor body 20. As described above, in the mirror face adjustment device 86 the tilting body 90 tilts with respect to the fixed portion 88, and the mirror 92 tilts as a single unit with the tilting body 90 such that the tilt position of the mirror 92 (the angle of the mirror face 92A) can be adjusted. The mirror 92 enters the inclined recess portion 64 or the curved recess portion 66 of the inner cover 54 depending on the tilt position of the mirror 92.

Explanation now follows regarding the operation of the present exemplary embodiment.

In the vehicle door mirror device 10 according to the above configuration, the stowage device 16 is capable of rotation with respect to the stay 12, and the main body portion 14 (including the mirror 92) is also capable of rotation with respect to the stay 12. The main body portion 14 can be housed by rotating the main body portion 14 from its usual position towards the vehicle rear side and the vehicle width direction inside with respect to the stay 12. The main body portion 14 can be folded forwards by rotating the main body portion 14 from its usual position towards the vehicle front side and the vehicle width direction inside with respect to the stay 12.

The mirror face adjustment device 86 can adjust the tilt position of the mirror 92 by tilting the tilting body 90 with respect to the fixed portion 88, thereby tilting the mirror 92 as a single unit with the tilting body 90.

The upper covering plate 68 and the lower covering plate 76 of the inner cover 54 respectively cover the upper recess portion 36 and the lower recess portion 40 of the peripheral wall 30 of the visor body 20. The front face of the upper covering plate 68 curves so as to be continuous with the faces of the upper peripheral wall 30A and the inner peripheral wall 30C of the peripheral wall 30. The front face of the lower covering plate 76 also curves so as to be continuous with the faces of the lower peripheral wall 30B and the inner peripheral wall 30C of the peripheral wall 30. A loss of look of the visor body 20 at the mirror 92 outer periphery side due to the upper recess portion 36 and the lower recess portion 40 can thereby be suppressed. The look can accordingly be enhanced for the visor body 20 at the mirror 92 outer periphery side, and the quality of the external appearance of the vehicle door mirror device 10 can be enhanced.

The assembly clip 52 at the vehicle width direction inside at the upper portion of the visor cover 50 engages with the assembly hole 44 at the vehicle width direction inside at the upper portion of the visor body 20, inside the upper recess portion 36 of the visor body 20. The engagement portion (assembly portion) of this assembly clip 52 and this assembly hole 44 is thereby concealed by the upper covering plate 68 of the inner cover 54. Noticing (viewing) the engagement portion from between the visor body 20 and the mirror 92 can thereby be suppressed or prevented. The look of the visor body 20 at the mirror 92 outer periphery side is thus further enhanced, and the quality of the external appearance of the vehicle door mirror device 10 is further enhanced.

The upper face, lower face and vehicle rear side face of the upper covering plate 68 of the inner cover 54 respectively fit to the upper face, lower face and vehicle rear side face (the external wall 34) of the opening portion of the upper recess portion 36 of the visor body 20. The vehicle rear side end faces of the first upper abut plates 70 of the upper covering plate 68 fit to the vehicle rear side face (the external wall 34) of the opening portion of the upper recess portion 36, and the abut wall 38 inside the upper recess portion 36 fits into the abut recess portions 74 of the second upper abut plates 72 of the upper covering plate 68. The upper covering plate 68 can thereby be positioned in the upper recess portion 36, and the upper covering plate 68 can appropriately cover the opening portion of the upper recess portion 36.

The upper face, vehicle front side face and vehicle rear side face of the lower covering plate 76 of the inner cover 54 fit to the upper face (the coupling wall 28), the vehicle front side face (the circular peripheral wall 32) and the vehicle rear side face (the external wall 34) of the opening portion of the lower recess portion 40 in the visor body 20. The vehicle rear side faces of the first lower abut plates 78 of the lower covering plate 76 fit to the vehicle rear side face (the external wall 34) of the opening portion of the lower recess portion 40, and vehicle front side end faces of the second lower abut plates 80 of the lower covering plate 76 fit to the vehicle front side face (the circular peripheral wall 32) of the opening portion of the lower recess portion 40. The lower face of the third lower abut plate 82 of the lower covering plate 76 fits to the lower face (lower peripheral wall 30B) of the opening portion of the lower recess portion 40. The lower side portion of the abut projection 84 of the lower covering plate 76 fits into the abut hole 42 in the lower peripheral wall 30B of the visor body 20, and the upper side portion of the abut projection 84 abut the periphery of the abut hole 42 in the lower peripheral wall 30B. The lower covering plate 76 can thereby be positioned in the lower recess portion 40, and the lower covering plate 76 can appropriately cover the opening portion of the lower recess portion 40.

In the inner cover 54, the protrusion portions 62 that couple the attachment plate 56 to the upper covering plate 68 and the lower covering plate 76 protrude out towards the accommodating chamber 22 side (the opposite side to the visor body 20). When shrinkage of the inner cover 54 after molding, a displacement force (rotation force) acts due to the protrusion portions 62 to displace the upper covering plate 68 and the lower covering plate 76 towards the upper recess portion 36 side and the lower recess portion 40 side, respectively, (the opposite side to the accommodating chamber 22) with respect to the attachment plate 56. Displacement (rotation) of the upper covering plate 68 and the lower covering plate 76 with respect to the attachment plate 56 towards the opposite side to the upper recess portion 36 and the opposite side to the lower recess portion 40, respectively, (the accommodating chamber 22 side) due to shrinkage of the inner cover 54 after molding can thereby be suppressed. The upper covering plate 68 and the lower covering plate 76 can accordingly cover the upper recess portion 36 and the lower recess portion 40, respectively, even more appropriately.

The inner cover 54 is attached, at the attachment plate 56 that is a different member from to the upper covering plate 68 and the lower covering plate 76, together with the bottom wall 24 of the visor body 20, to the stowage device 16 by the screw 26, thereby attaching the inner cover 54 to the visor body 20. The inner cover 54 can thereby easily be firmly attached to the visor body 20, unlike a case in which the inner cover 54 is attached to the visor body 20 at the upper covering plate 68 and the lower covering plate 76.

The engagement portion 58 of the inner cover 54 (attachment plate 56) engages with the engaged portion 60 of the visor body 20 (bottom wall 24), stopping rotation towards the vehicle width direction outside (in the screw 26 rotation attachment direction). Rotation of the inner cover 54 with respect to the visor body 20 due to the rotation of the screw 26 can accordingly be stopped when the inner cover 54 is being attached, together with the visor body 20, to the stowage device 16 by rotational attachment of the screw 26. The inner cover 54 can thereby be appropriately positioned to the visor body 20, and the upper covering plate 68 and the lower covering plate 76 can cover the upper recess portion 36 and the lower recess portion 40, respectively, even more appropriately.

The mirror 92 enters the curved recess portion 66 or the inclined recess portion 64 of the attachment plate 56 of the inner cover 54 depending on the tilt position of the mirror 92. The attachment plate 56 can thereby be suppressed from restricting tilting of the mirror 92, thereby suppressing the possible tilt range of the mirror 92 from being narrowed Due to detaching the mirror 92 from the tilting body 90 of the mirror face adjustment device 86, engage portions where the assembly holes 44, at the vehicle width direction intermediate at the upper portion and the vehicle width direction outside at the upper-lower direction intermediate portion of the visor body 20, are engaged with the respective assembly clips 52, at the vehicle width direction intermediate at the upper portion and the vehicle width direction outside at the upper-lower direction intermediate portion of the visor cover 50, to be seen from the vehicle rear side of the accommodating chamber 22 of the visor body 20. The engage of these assembly holes 44 and their respective assembly clips 52 can accordingly be disengaged with ease.

Detaching the screw 26 from the stowage device 16 to remove the inner cover 54 from the visor body 20 enables the engage portion where the assembly hole 44, at the vehicle width direction inside at the upper portion of the visor body 20, is engaged with the assembly clip 52 at the vehicle width direction inside at the upper portion of the visor cover 50 to be seen via the inside of the upper recess portion 36 from the vehicle rear side of the accommodating chamber 22 of the visor body 20. The engage of the assembly hole 44 and the assembly clip 52 can accordingly be disengaged with ease.

By stowing or folding forward the main body portion 14, the work hole 46 of the visor body 20 is moved to the vehicle front side or the vehicle rear side of the support portion 12A of the stay 12. It is thus possible to see the engage portion where the assembly hole 44 at the vehicle width direction inside at the lower portion of the visor body 20 is engaged with the assembly clip 52 at the vehicle width direction inside at the lower portion of the visor cover 50 through the work hole 46 from the lower side of the visor body 20. The engage of this assembly hole 44 and the assembly clip 52 can accordingly be disengaged with ease.

The visor cover 50 can hence be removed from the visor body 20 with ease by disengaging engagement of all the assembly holes 44 in the visor body 20 and all the assembly clips 52 in the visor cover 50 in this way. Damage to the all assembly holes 44 or the all assembly clips 52, and hence damage to the visor body 20 or the visor cover 50, during removal of the visor cover 50 from the visor body 20 can accordingly be suppressed. The visor cover 50 can hence be reassembled to the visor body 20 without the need to replace the visor cover 50 or the visor body 20, and easy replacement can also be achieved of the visor cover 50 to the visor body 20.

Removing the visor cover 50 from the visor body 20 means that the upper end portion of the lamp 48 is no longer covered by the visor cover 50, allowing removal of the lamp 48 from the visor body 20. The lamp 48 can be removed from the visor body 20 with ease since the visor cover 50 can easily be removed from the visor body 20 in the manner described above, allowing repairs to the lamp 48 to be carried out with ease, and also allowing easy replacement of the lamp 48 to the visor body 20.

Note that in the present exemplary embodiment, the assembly holes 44 are provided to the visor body 20 and the assembly clips 52 are provided to the visor cover 50. However configuration may be made such that the assembly clips 52 are provided to the visor body 20 and the assembly holes 44 are provided to the visor cover 50.

In the present exemplary embodiment, the vehicle mirror device of the present invention is applied to the vehicle door mirror device 10. However, the vehicle mirror device of the present invention may also be applied to another exterior vehicle mirror device (for example a vehicle fender mirror device) or to an internal vehicle mirror device.

What is claimed is:

1. A vehicle mirror device comprising:
   an accommodating body whose inside portion includes an accommodating chamber, a vehicle mirror being accommodated within the accommodating chamber, a peripheral wall of the accommodating chamber forming an opening portion of the accommodating chamber and the vehicle mirror being disposed within an inner peripheral face of the peripheral wall, and a first opening hole and a second opening hole being provided at the peripheral wall forming the opening portion of the accommodating chamber;

a covering member within the accommodating chamber that covers the first opening hole and the second opening hole wherein a first abut portion and a second abut portion are provided at the covering member that respectively abut a portion of the first opening hole and a portion of the second opening hole of the accommodating body.

2. The vehicle mirror device of claim 1, wherein the covering member includes an attachment section that is attached to an accommodating body side, and a first covering portion and a second covering portion that are respectively provided at one end portion and another end portion of the attachment section, and respectively cover the first opening hole and the second opening hole.

3. The vehicle mirror device of claim 2, wherein the covering member includes a protrusion portion, the protrusion portion being coupled to the first covering portion, the second covering portion and the attachment section, and protruding towards an accommodating chamber side.

4. The vehicle mirror device of claim 2, wherein the attachment section includes a recess portion into which the mirror enters when the mirror is tilted.

5. The vehicle mirror device of claim 2, wherein the attachment section includes an engagement portion that engages with the accommodating body side and stops rotation of the covering member.

6. The vehicle mirror device of claim 1, wherein:
the accommodating body includes an accommodating section in which the accommodating chamber is provided, and an assembled section that is assembled to the accommodating section at a side opposite to the accommodating chamber; and
the accommodating section and the assembled section are assembled at the first opening hole and the second opening hole.

* * * * *